(12) United States Patent
Haas (10) Patent No.: US 7,797,680 B2
(45) Date of Patent: Sep. 14, 2010

(54) METHOD AND FRAMEWORK FOR TEST CASE MANAGEMENT

(75) Inventor: Rolf W. Haas, Schramberg (DE)

(73) Assignee: SAP AG, Walldorf (DE)

( * ) Notice: Subject to any disclaimer, the term of this patent is extended or adjusted under 35 U.S.C. 154(b) by 1326 days.

(21) Appl. No.: 10/868,896

(22) Filed: Jun. 17, 2004

(65) Prior Publication Data

US 2005/0283761 A1 Dec. 22, 2005

(51) Int. Cl.
*G06F 9/44* (2006.01)

(52) U.S. Cl. .......................... 717/124; 714/38

(58) Field of Classification Search .................. 717/124
See application file for complete search history.

(56) References Cited

U.S. PATENT DOCUMENTS

| | | | | |
|---|---|---|---|---|
| 5,634,098 A * | 5/1997 | Janniro et al. | .................. | 714/38 |
| 5,655,072 A * | 8/1997 | Wolff | .......................... | 714/25 |
| 5,671,351 A * | 9/1997 | Wild et al. | ..................... | 714/38 |
| 5,751,941 A * | 5/1998 | Hinds et al. | .................... | 714/38 |
| 5,974,569 A * | 10/1999 | Nickles | ........................ | 714/38 |
| 6,002,869 A * | 12/1999 | Hinckley | .................... | 717/124 |
| 6,002,871 A * | 12/1999 | Duggan et al. | ............... | 717/135 |
| 6,031,990 A * | 2/2000 | Sivakumar et al. | .......... | 717/124 |
| 6,058,493 A * | 5/2000 | Talley | ......................... | 714/38 |
| 6,304,982 B1 * | 10/2001 | Mongan et al. | .............. | 714/38 |
| 6,408,403 B1 * | 6/2002 | Rodrigues et al. | ............ | 714/38 |
| 6,601,018 B1 * | 7/2003 | Logan | ......................... | 702/186 |
| 6,654,911 B1 * | 11/2003 | Miles | ............................ | 714/38 |
| 6,662,312 B1 * | 12/2003 | Keller et al. | ................... | 714/38 |
| 6,701,514 B1 * | 3/2004 | Haswell et al. | ............. | 717/115 |
| 6,718,537 B1 * | 4/2004 | Miles | .......................... | 717/127 |
| 6,889,158 B2 * | 5/2005 | Penov et al. | ................. | 702/119 |
| 7,020,797 B2 * | 3/2006 | Patil | ............................... | 714/4 |
| 7,089,534 B2 * | 8/2006 | Hartman et al. | ............. | 717/125 |
| 7,113,883 B1 * | 9/2006 | House et al. | ................. | 702/122 |
| 7,159,021 B2 * | 1/2007 | Boldman et al. | ............. | 717/101 |
| 7,165,256 B2 * | 1/2007 | Boudnik et al. | ............. | 718/104 |
| 7,373,636 B2 * | 5/2008 | Barry et al. | .................. | 717/124 |
| 2002/0124042 A1 * | 9/2002 | Melamed et al. | ............ | 709/102 |
| 2003/0056173 A1 * | 3/2003 | Copenhaver et al. | ........ | 715/513 |
| 2003/0208351 A1 * | 11/2003 | Hartman et al. | ............... | 703/22 |
| 2004/0015846 A1 * | 1/2004 | Haisraeli | ..................... | 717/115 |
| 2004/0107415 A1 * | 6/2004 | Melamed et al. | ............ | 717/124 |
| 2004/0243381 A1 * | 12/2004 | Kuturianu et al. | ............. | 703/22 |
| 2006/0020920 A1 * | 1/2006 | Septon | ........................ | 717/124 |

\* cited by examiner

*Primary Examiner*—Lewis A Bullock, Jr.
*Assistant Examiner*—Jue Wang
(74) *Attorney, Agent, or Firm*—Kenyon & Kenyon LLP (57) ABSTRACT

In accordance with an embodiment of the present invention, a method may include obtaining a list of active life cycle test objects in a test run from a life cycle test object controller, and obtaining a list of active central activity test objects in the test run from a central activity test object controller. While a test period remains in the test run, the method may continue selecting a next test period, requesting the test step initialization controller initialize the next test period, requesting all central activity test objects associated with the next test period to execute their beginning central activities, requesting all life cycle test objects associated with the next test period to execute their test activities, and requesting all central activity test objects associated with the next test period to execute their ending central activities.

59 Claims, 6 Drawing Sheets

METHOD AND FRAMEWORK FOR TEST CASE MANAGEMENT

FIELD OF THE INVENTION

The field of the invention relates to software application testing and, in particular to methods of and a framework for the automatic testing of multiple independent test cases in complex software applications.

BACKGROUND

Currently test programs for testing complex software applications, for example, applications for complex business processes, are themselves complex and frequently very large in size, since they not only have to model the applications, but also all of the constituent sub-processes and associated data. For example, these software applications usually implement generic business processes, which model industry operations. The software applications must be customized to fit each customer's role in the marketplace and to fit the customer's specific data. As a result, the complexity and size of each test program can increase dramatically where some or all of a number of test cases for the application must run in parallel, since this scenario must also be programmed into the test program. For example, in a banking environment, a test case defines the activities that occur in an account (e.g., opening the account, depositing funds, withdrawing funds, closing the account, etc.) over a period of time.

In general, the test cases that must run in parallel are independent of each other, (for example, each test case represents activities that occur in different accounts), but, at some select points, called "sync points" (i.e., "synchronization points") in the test cases, the flow of the test cases must be interrupted and a "central activity," for example, a central test activity, must be performed. For example, in the banking environment, the central activity can be an activity that occurs at a specified time, e.g., at the beginning of a day, at the end of the day, at the end of a month, at the end of a reporting period, etc. The central (or global) activity, generally, exerts an influence on all or almost all of the test cases. After the central activity has been performed, the individual test cases may continue to be executed. The test program continues until all of the test cases and central activities have been executed for some predetermined time period.

The current general architecture is used in transaction banking to test business cases of core banking functionality for long time periods and where the central activities can include "end of the day processing" jobs, which are set to run every night. Unfortunately, if changes/additions need to be made to the test cases, currently, the entire test program must be edited to incorporate the changes and/or additions. For example, in the banking scenario, a customer's checking and savings accounts are programmed as separate accounts, since they operate independently of each other. However, if the two accounts are to be associated to enable transfers between the accounts, the test program will have to be modified to include this functionality by deleting the separate code sections for each type of account and adding new code directed to a hybrid test case where the customer's checking and savings accounts are handled in the single test case. This is not an insignificant change and it can be a time consuming and costly process.

Therefore, an efficient and easily modifiable test architecture to permit the addition and removal of test cases without having to change existing test cases is highly desirable.

DETAILED DESCRIPTION

Embodiments of the present invention provide improved methods of and infrastructures, for example, frameworks, for the automatic testing of multiple independent test cases in complex software applications. In general, a framework is a standard, generic software architecture on which components of multiple applications may be instantiated/implemented to provide cross-application compatibility. In accordance with an embodiment of the present invention, a method for the automatic testing of complex software applications having multiple, independent test cases, may include obtaining test initialization information and determining a first test period from the test initialization information. The method may also include executing one or more beginning central test activities, if the one or more beginning central test activities are associated with the first test period; executing activities for at least one of a plurality of independent test cases associated with the first test period in the test framework; and executing one or more ending central test activities, if the one or more ending central test activities are associated with the first test period. The method may further include determining that subsequent test periods exist and then for each determined subsequent test period, initializing the subsequent test period; executing a subsequent beginning central test activity, if the subsequent beginning central test activity is associated with the subsequent test period; and executing activities for at least one of the plurality of independent test cases associated with the subsequent test period in the test framework; and executing a subsequent ending central test activity, if the subsequent ending central test activity is associated with the subsequent test period. The method may also include storing results of all of the executions from all of the test periods.

Figure 1:
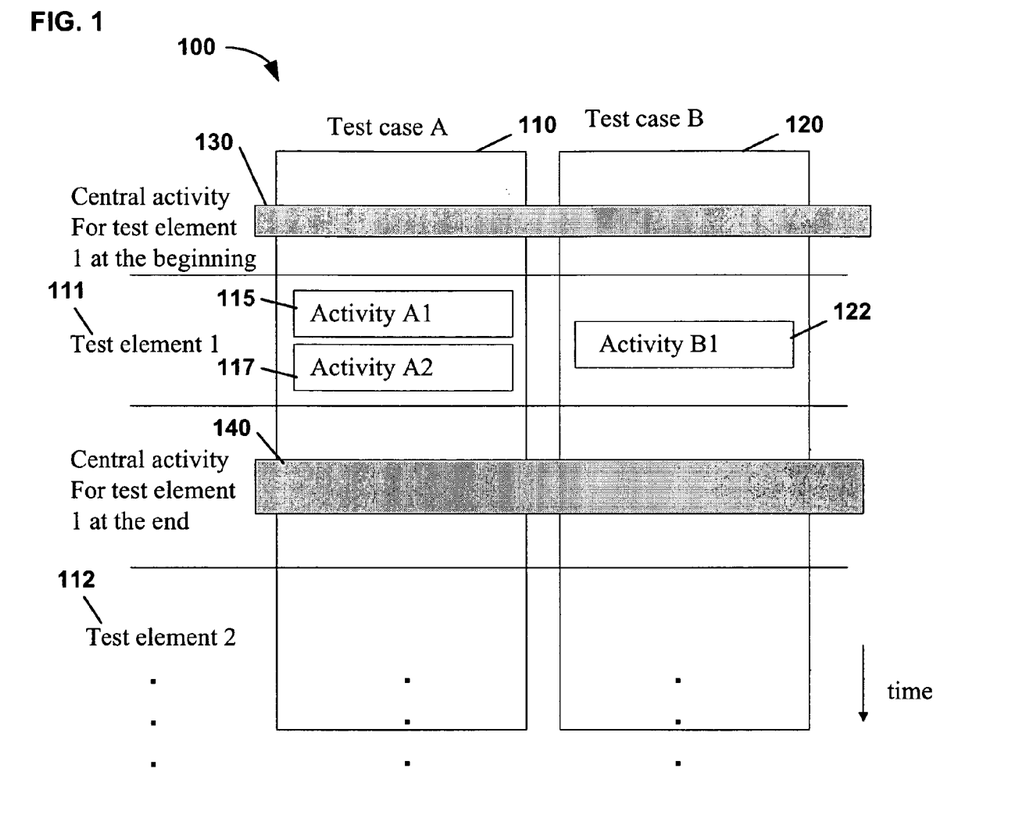
FIG. 1 is a block diagram showing the execution of multiple test cases in a generic complex application test program, in accordance with an embodiment of the present invention.

FIG. 1 is a block diagram showing the execution of multiple test cases in a generic complex application test program, in accordance with an embodiment of the present invention. In FIG. 1, a test framework 100 may provide an architecture for automatic testing of complex applications with multiple, independent test cases. Each test case may be divided into one or more test elements, which may include one or more test activities, and, in general, the activities in each test case may be independent of the other test cases, with one exception, one or more central activities. In general, test elements may be globally applied across all test cases in the test program. As such, test elements may be interchangeably referred to as test elements and/or global test elements. Each test element may be used to define a discrete period within the test case, for example, in the banking environment at test element may define a bank business day, a monthly reporting period, etc. A central activity, in general, may be performed in relation to a specific test element at a certain point in each case. Similarly, when several test cases are being executed concurrently, a common central activity may be only executed once and at the same time for all of the concurrently executing test cases. As a result, the execution of some test cases may be held up until all of the test cases executing during the test cases executing during the current test element are complete.

In FIG. 1, the test flow is shown from the viewpoint of the application to be tested, in accordance with an embodiment of the present invention. Test framework 100, in FIG. 1, may include a first test case 110 and a second test case 120 that may be concurrently executing. First test case 110 and second test 120 may include one or more separate test elements that represent a time period within each test case, for example, a first test element 111 and a second test element 112. Each test period represents a specific time period within each test case. First test case 110 may also include one or more activities associated with each test element, for example, a first test case first activity 115 and a first test case second activity 117 and a second test case first activity 122 may be associated with first test element 111. In embodiments of the present invention, the activities in first test case 110 and second test case 120 may be the same and/or different from each other, but regardless, the activities may be executed independently of each other. As illustrated in FIG. 1, a starting central test activity 130 for first test element 111 and an ending central test activity 140 for first test element 111 may be associated with first test case 110 and second test case 120. For example, in FIG. 1, first test case 110 may represent the transactions (activities) that occur in bank customer's savings account over time. Specifically, first test element 111 may define the activities that may occur in a standard business day.

In FIG. 1, although only two test cases are shown for ease of illustration, it should be clearly understood that embodiments of the present invention are contemplated in which more than two test cases may be concurrently executing and in which one test case may be executing.

In FIG. 1, execution flows of first test case 110 and second test case 120 are shown to run from the top to the bottom of FIG. 1. Accordingly, starting central test activity 130 for first test element 111 may be executed before first test element 111 may be started in first test case 110 and second test case 120. In general, no other activities may be concurrently executing with starting central test activity 130, which may also complete executing before first test case 110 and second test case 120 may each begin executing first test element 111 and the individual activities contained therein. Upon completing the execution of starting central test activity 130, the activities associated with first test case 110 and second test case 120 in first test element 111, namely first test case first activity 115, first test case second activity 117 and second test case first activity 122, may be concurrently executed. Upon completion of the execution of first test element 111, which may be signaled by completion of the execution of all of the activities in each of first test case 110 and second test case 120, execution of ending central test activity 140 may be performed. As before, upon completing the execution of ending central test activity 140, any activities (not shown) associated with first test case 110 and second test case 120 in second test element 112 may be concurrently executed. Upon completion of the execution of second test element 112, which may be signaled by completion of the execution of all of the activities in each of first test case 110 and second test case 120, execution of a second test element ending central activity (not shown) may be performed. Execution of each test case may continue as described above to continue concurrently executing subsequent test element activities associated with each test case followed by execution of a common ending central activity until a predetermined time or neither test case has any remaining test elements to be executed.

In another embodiment of the present invention, although not shown in FIG. 1, a new starting central activity may be executed prior to executing the activities in second test element 112, as well as in subsequent test elements (not shown).

The advantage of test framework 100, in FIG. 1, is that although the test cases (i.e., first test case 110 and second test case 120) may be defined independently of each other, it is also possible to integrate central activities in these test cases. Therefore, new test cases may easily be added to test framework 100, since the new test cases do not influence the existing tests.

Figure 2:
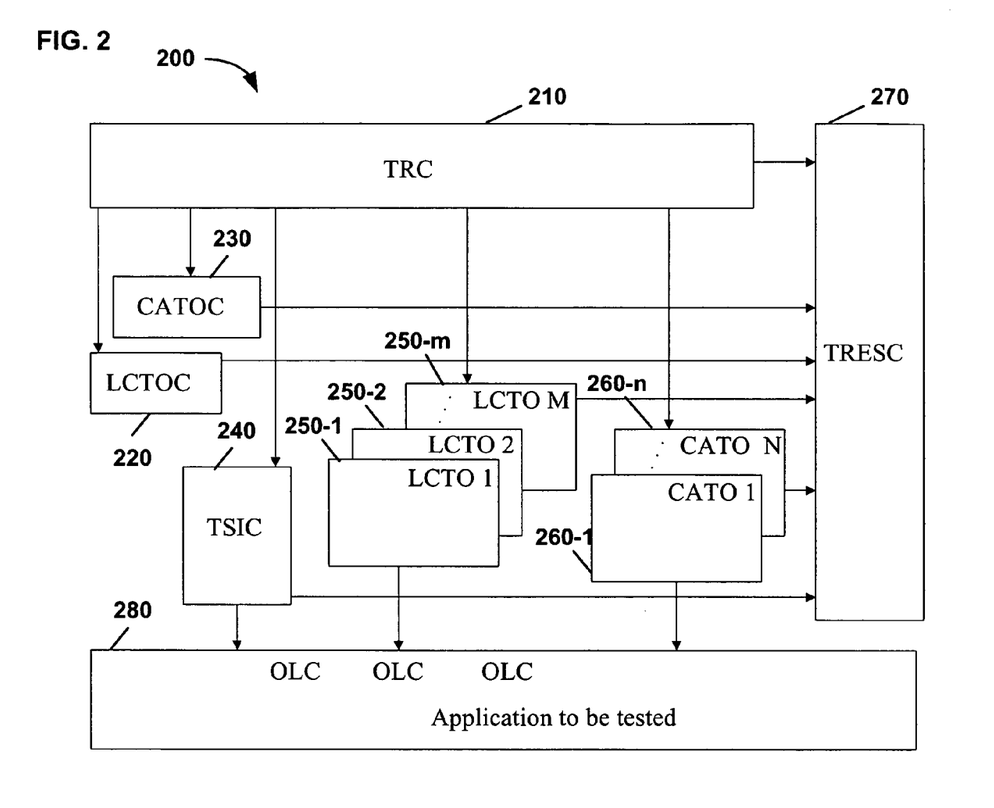
FIG. 2 is a block diagram of a test framework architecture for the automatic testing of complex applications with multiple independent test cases, in accordance with an embodiment of the present invention.

FIG. 2 is a block diagram of a test framework architecture for the automatic testing of complex applications with multiple independent test cases, in accordance with an embodiment of the present invention. In FIG. 2, a test framework architecture 200 may include a test run controller ("TRC") 210 that may be coupled to a life cycle test object controller ("LCTOC") 220, a central activity test object controller ("CATOC") 230, a test step initialization controller ("TSIC") 240, one or more life cycle test objects ("LCTOs") 250-1 to 250-m, one or more central activity test objects ("CATOs") 260-1 to 260-n, and a test result controller ("TRESC") 270. Each of LCTOC 220, and CATOC 230 may be coupled to TRESC 270. Likewise, TSIC 240, one or more LCTOs 250-1 to 250-m, and one or more CATOs 260-1 to 260-n may be coupled to an application 280 to be tested and to TRESC 270.

In FIG. 2, TRC 210 may be the master test object that is responsible for controlling a complete test run, which can include one or more test cases and, in general, one or more central test activities. TRC 210 may communicate with LCTOs 250-1 to 250-m and CATOs 260-1 to 260-n. TRC 210 may inform LCTOs 250-1 to 250-m when it needs to perform a test step in their "object life cycle" and TRC 210 may inform CATOs 260-1 to 260-n when a central activity must be performed. TRC 210 may also start the switching to the next "test step of the complete test run" by calling TSIC 240. TRC 210 may send messages, for example, error messages generated by the framework, to TRESC 270 for storage.

In FIG. 2, each LCTO 250-1 to 250-m may be responsible for testing one scenario, for example, the whole life cycle of an application object ("OLC"—object life cycle) in application 280 that has to be tested. The test may consist of a sequence of test actions where each test action may belong to exactly one test element of the complete test run. Between each test element, central actions (for all OLCs together at the same time) may be necessary. Generally, LCTO 250-1 may be independent of the other LCTOs 250-2 to 240-m and, thus, LCTO 250-1 may only have influence on the OLC for which it is responsible. Likewise, LCTO 250-1 and the related OLC have no influence on the behavior of the other OLCs in application 280. As a result, the test architecture is scalable so that a new LCTO may be added that may have no impact on the existing LCTOs and OLCs. Each LCTO 250-1 to 250-*m* may be called by TRC 210 for a special "general test element" and each LCTO 250-1 to 250-*m* may perform all of the activities belonging to the "general test element." LCTO 250-1 to 250-*m* may send messages, for example, error messages generated as a result of test activity, to TRESC 270 for storage.

In FIG. 2, in general, only one instance of LCTOC 220 may exist in test framework architecture 200 and LCTOC 220 may have persistent knowledge about each LCTO 250-1 to 250-*m* in test framework architecture 200. LCTOC 220 may send messages, for example, error messages generated at the framework level, to TRESC 270 for storage.

In FIG. 2, CATOs 260-1 to 260-*n* may each be test objects that are responsible for central test activities. In general, there are two kinds of central test activities, for example, activities that may be performed at the beginning of a "test element of the complete test run" and activities that may be performed at the end of a "test element of the complete test run". These activities may have influence on several OLCs in application 280. Each CATO may be called by TRC 210 for a special "general test element" with the control-information "beginning or end of this general test element" and the information which central test activities must be performed. CATOs 260-1 to 260-*n* may send messages, for example, error messages generated as a result of test activity, to TRESC 270 for storage.

In FIG. 2, in general, only one instance of CATOC 230 may exist in test framework architecture 200 and CATOC 230 may have persistent knowledge about each CATO 260-1 to 260-*n* and the activities that are available from each CATO 260-1 to 260-*n*. CATOC 230 may send messages, for example, error messages generated at the framework level, to TRESC 270 for storage.

In FIG. 2, TSIC 240 may be responsible for the global initialization of the next "test element of the complete test run" and, in general, there may be only one instance of TSIC 240. Likewise, in FIG. 2, in general, only one instance of TRESC 270 may exist and may be responsible for persistent storage of the test results (e.g., errors and ok messages). Messages may be assigned to the test objects (i.e., LCTOs 250-1 to 250-*m* and CATOs 260-1 to 260-*n*). TSIC 240 may send messages, for example, error messages generated as a result of test activity, to TRESC 270 for storage.

In test framework architecture 200 of FIG. 2, a test run may be performed by starting TRC 210 and having it obtain a list of active LCTOs 250-1 to 250-*m* from LCTOC 220 and a list of active CATOs 260-1 to 260-*n* from CATOC 230. TRC 210 may initialize a current test element counter variable to equal one (1), for example, actual_global_test_element=1. TRC 210 may call TSIC 240 to initialize a loop for the current test element specified by the current test element, for example, first test element 111, specified by the current test element counter variable and call CATOs 260-1 to 260-*n* to perform central activities, for example, starting central activity 130, for the "start part" of the current test element. TRC 210 may call LCTOs 250-1 to 250-*m* to perform test activities, for example, first test case first activity 115, first test case second activity 117 and a second test case first activity 122, belonging to the current test element and call CATOs 260-1 to 260-*n* to perform central activities, for example, ending central activity 140, for the "end part" of the current test element. TRC 210 may determine whether there are more test elements to be executed, increment the current test element counter variable by 1 and loop back to call TSIC 240 to initialize a new loop for the incremented test element and continue executing the test cases for the next test element, for example, second test element 112, as described above, if this was not the last test element. However, if there are no more test elements, TRC 210 may stop executing the test cases.

In general, in FIG. 2, test executions in test framework architecture 200 may produce reproducible results, since the test cases generally start from a standard initialized system environment state and LCTOs 250-1 to 250-*m* for each test case consistently specify what is needed to perform the tests from the standard initialized system environment state. To ensure that LCTOs 250-1 to 250-*m* can consistently specify what is needed, it is important to correctly determine which LCTO is to perform the test activities in a general test element. In one embodiment of the present invention, this determination may be accomplished at the beginning of execution of each test element by having TRC 210 request that each LCTO 250-1 to 250-*m* return a list of all relevant "global test elements" associated with that LCTO.

In another embodiment of the present invention, in FIG. 2, TRC 210 may also correctly determine which LCTO is to perform test activities in a general test element by requesting each LCTO 250-1 to 250-*m* to return a number of first global test element 111. It should be noted that the number may be greater than or equal to a given "global test element," since TRC 210 may not always start with element 1. Alternatively, TRC 210 may request LCTOC 220 to return the first "global test element" for each LCTO 250-1 to 250-*m* and this information may be persistently stored in LCTOC 220. After performing the test activities of the last test element of an LCTO, for example LCTO 250-1, LCTO 250-1 may return a special return code to TRC 210 to indicate that there are no more test elements to be performed by LCTO 250-1.

In general, TRC 210 may determine that the execution of a test run is complete when one of the following conditions occurs: a last "global test element" has been executed; a user starting TRC 210 explicitly set a "max number of global test elements" and the maximum number of global test elements have been performed; or an error has occurred in one of CATOs 260-1 to 260-*n*.

During the execution of a test case, in test framework architecture 200 of FIG. 2, it is important to determine which LCTO 250-1 to 250-*m* needs what global test activities at the beginning and/or end of which global test element. In accordance with one embodiment of the present invention, this determination may be accomplished by having TRC 210 request each LCTO 250-1 to 250-*m* return a list to identify:

a global test element;

an activity to be performed at the beginning or end of this global test element;

a CATO-ID; and an activity-ID.

In accordance with another embodiment of the present invention, the determination of the global test activities that are needed may be accomplished by having each LCTO 250-1 to 250-*m* implement a service to determine the next central activities that may be needed. For example, the service may receive as an input a global test element and may output the next global test element that is greater than or equal to the input global test element for which each LCTO may need global test activities. A list of test activities for each global test element 111, 112 may identify:

whether an activity should be performed at the beginning or end of the global test element;

a CATO-ID; and an activity-ID.

Although, TRC 210 may call every LCTO 250-1 to 250-*m* at the beginning of every global test element, TRC 210 may call at the end of every global test element only those LCTOs for which global test activities have been performed in the global test element.

In accordance with an embodiment of the present invention, a test case may be defined by the definition of a LCTO, which may describe the complete test scenario and may be internally structured by test elements. As a result, each test activity of the LCTO may be assigned to exactly one test element.

In the test execution phase, TRC 210 may be responsible for executing the test. The main object used in executing the tests is the "test element". This means that TRC 210 may loop at all relevant test elements and in each loop it may call all LCTOs 250-1 to 250-m to perform the test activities belonging only to this test element.

Integration of central activities. In FIG. 2, test framework architecture 200 may also perform central activities that may have influence on several OLCs. Every LCTO 250-1 to 250-m may request such central activities be performed at the beginning or at the end of a test element. LCTOs 250-1 to 250-1 may inform TRC 210 about the central activities they need. The central activities may be performed by CATOs 260-1 to 260-n and TRC 210 may inform CATOs 260-1 to 260-n when to perform a central activity.

Test framework architecture 200, in FIG. 2, may support the execution of several different test alternatives including:

Alternative 1: Run the complete test
Alternative 2: Run the tests from the beginning until a special "global test element"
Alternative 3: Continue a test run which was interrupted in a previous run (by choosing alternative 2)

Where, alternative 2 may be useful in the following cases:
Performing a software upgrade between alternative 2 and alternative 3
Making some detailed manual checks after the tests performed by alternative 2

Behavior after an error. In FIG. 2, if an error occurs in one of LCTOs 250-1 to 250-m, for example, LCTO 250-1, LCTO 250-1 may stop and all other parts of the central test may continue executing. However, if an error occurs in one of CATOs 260-1 to 260-n or in TRC 210 or TSIC 240, the complete test run may stop.

Figure 3:
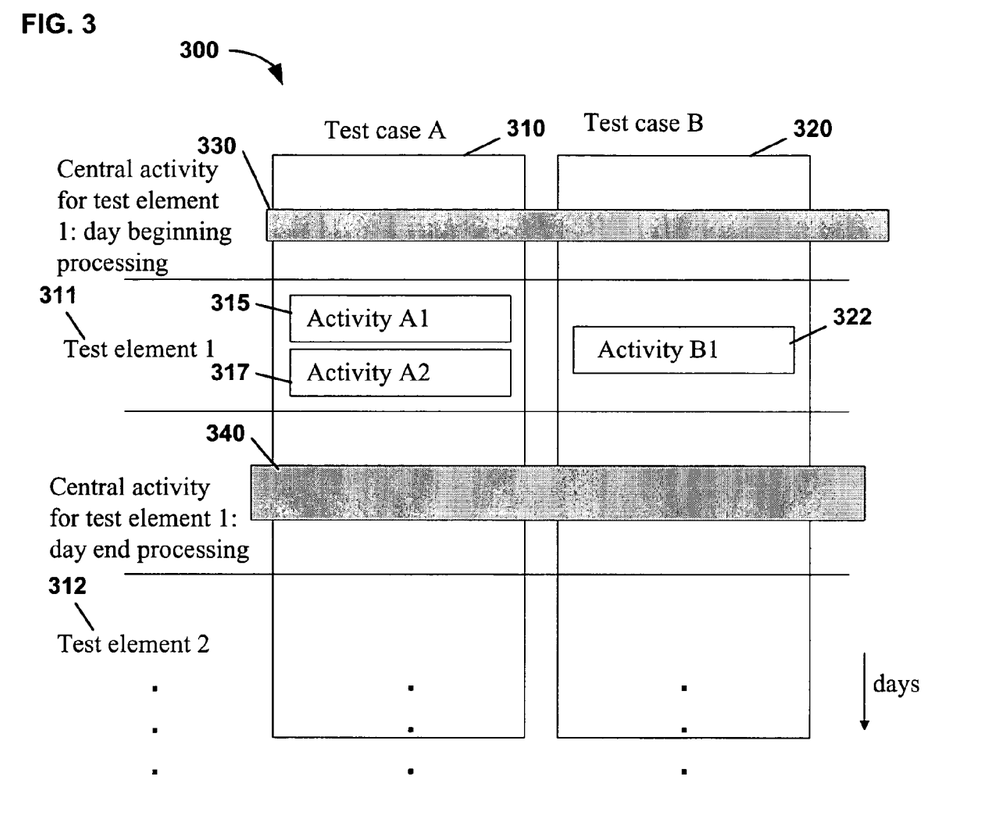
FIG. 3 is a block diagram showing the execution of multiple test cases in a complex core banking application test program, in accordance with an embodiment of the present invention.

FIG. 3 is a block diagram showing the execution of multiple test cases in a complex core banking application test program, in accordance with an embodiment of the present invention. In FIG. 3, a test framework may provide an architecture for automatic testing of complex core banking applications with multiple independent test cases. Each test case may be divided by one or more test elements representing calendar days, consist of several test activities, which may include and, in general the activities in each test case may be independent of the other test cases, with one exception, one or more central activities. In general, test elements may be globally applied across all test cases in the test program. As such, test elements may be interchangeably referred to as test elements and/or global test elements. A central activity, in general, may be performed in relation to a specific test element at a certain point in each test case. Similarly, when several test cases are being executed concurrently, a common central activity may be executed once and at the same time for all of the concurrently executing test cases.

In FIG. 3, the test flow is shown from the viewpoint of the application to be tested, in accordance with an embodiment of the present invention. Test framework 300, in FIG. 3, may include a first test case 310 and a second test case 320 that may be concurrently executing. First test case 310 and second test 320 may include one or more separate test elements, for example, a first test element 311 and a second test element 312. First test case 310 may also include one or more activities associated with each test element, for example, a first test case first activity 315 and a first test case second activity 317 and a second test case first activity 322 may be associated with first test element 311. In embodiments of the present invention, the activities in first test case 310 and second test case 320 may be the same and/or different from each other, but regardless, the activities may be executed independently of each other. As illustrated in FIG. 3, a starting central test activity 330 for first test element 311 and an ending central test activity 340 for first test element 311 may be associated with first test case 310 and second test case 320.

In FIG. 3, although only two test cases are shown for ease of illustration, it should be clearly understood that embodiments of the present invention are contemplated in which more than two test cases may be concurrently executing and in which one test case may be executing.

In FIG. 3, execution flows of first test case 310 and second test case 320 are shown to run from the top to the bottom of the FIG. 3. Accordingly, starting central test activity 330 for first test element 311 may be executed before first test element 311 may be started in first test case 310 and second test case 320. In general, no other activities may be concurrently executing with starting central test activity 330, which may also complete executing before first test case 310 and second test case 320 may each begin executing first test element 311 and the individual activities contained therein. Upon completing the execution of starting central test activity 330, the activities associated with first test case 310 and second test case 320 in first test element 311, namely first test case first activity 315, first test case second activity 317 and second test case first activity 322, may be concurrently executed. Upon completion of the execution of first test element 311, which may be signaled by completion of the execution of all of the activities in each of first test case 310 and second test case 320, execution of ending central test activity 340 may be performed. As before, upon completing the execution of ending central test activity 340, any activities (not shown) associated with first test case 310 and second test case 320 in second test element 312 may be concurrently executed. Upon completion of the execution of second test element 312, which may be signaled by completion of the execution of all of the activities in each of first test case 310 and second test case 320, execution of a second test element ending central activity (not shown) may be performed. Execution of each test case may continue as described above to continue concurrently executing subsequent test element activities associated with each test case followed by execution of a common ending central activity until a predetermined time or neither test case has any remaining test elements to be executed.

In another embodiment of the present invention, although not shown in FIG. 3, a new starting central activity may be executed prior to executing the activities in second test element 112, as well as in subsequent test elements (not shown).

The advantage of test framework 300, in FIG. 3, is that although the test cases (i.e., first test case 310 and second test case 320) may be defined independently of each other, it is also possible to integrate central activities in these test cases. Therefore, new test cases may easily be added to test framework 300, since the new test cases do not influence the existing tests. In FIG. 3, these central activities may be the "day beginning processing" and the "day end processing" of the bank working days.

In FIG. 3, the test flow is shown from the viewpoint of the application to be tested, in accordance with an embodiment of the present invention. Test framework 300, in FIG. 3, may include a first test case 310 and a second test case 320 that may be concurrently executing. First test case 310 and second test 320 may include one or more separate test elements, for example, a first test element 311 and a second test element 312. First test case 310 may also include one or more activities associated with each test element, for example, a first test case first activity 315 and a first test case second activity 317 and a second test case first activity 322 may be associated with first test element 311. In embodiments of the present invention, the activities in first test case 310 and second test case 320 may be the same and/or different from each other, but regardless, the activities may be executed independently of each other. As illustrated in FIG. 3, a starting central test activity 330 for first test element 311 and an ending central test activity 340 for first test element 311 may be associated with first test case 310 and second test case 320.

In FIG. 3, although only two test cases are shown for ease of illustration, it should be clearly understood that embodiments of the present invention are contemplated in which more than two test cases may be concurrently executing and in which one test case may be executing.

In FIG. 3, execution flows of first test case 310 and second test case 320 are shown to run from the top to the bottom of the FIG. 3. Accordingly, starting central test activity 330 for first test element 311 may be executed before first test element 311 may be started in first test case 310 and second test case 320. In general, no other activities maybe concurrently executing with starting central test activity 330, which may also complete executing before first test case 310 and second test case 320 may each begin executing first test element 311 and the individual activities contained therein. Upon completing the execution of starting central test activity 330, the activities associated with first test case 310 and second test case 320 in first test element 311, namely first test case first activity 315, first test case second activity 317 and second test case first activity 322, may be concurrently executed. Upon completion of the execution of first test element 311, which may be signaled by completion of the execution of all of the activities in each of first test case 310 and second test case 320, execution of ending central test activity 340 may be performed. As before, upon completing the execution of ending central test activity 340, any activities (not shown) associated with first test case 310 and second test case 320 in second test element 312 may be concurrently executed. Upon completion of the execution of second test element 312, which may be signaled by completion of the execution of all of the activities in each of first test case 310 and second test case 320, execution of a second test element ending central test activity (not shown) may be performed. Execution of each test case may continue as described above to continue concurrently executing subsequent test element activities associated with each test case followed by execution of a common ending central test activity until a predetermined time or neither test case has any remaining test elements to be executed.

In another embodiment of the present invention, although not shown in FIG. 3, a new starting central activity may be executed prior to executing the activities in second test element 312, as well as in subsequent test elements (not shown).

The advantage of test framework 300, in FIG. 3, is that although the test cases (i.e., first test case 310 and second test case 320) may be defined independently of each other, it is also possible to integrate central activities in these test cases. Therefore, new test cases may easily be added to test framework 300, since the new test cases do not influence the existing tests.

Figure 4:
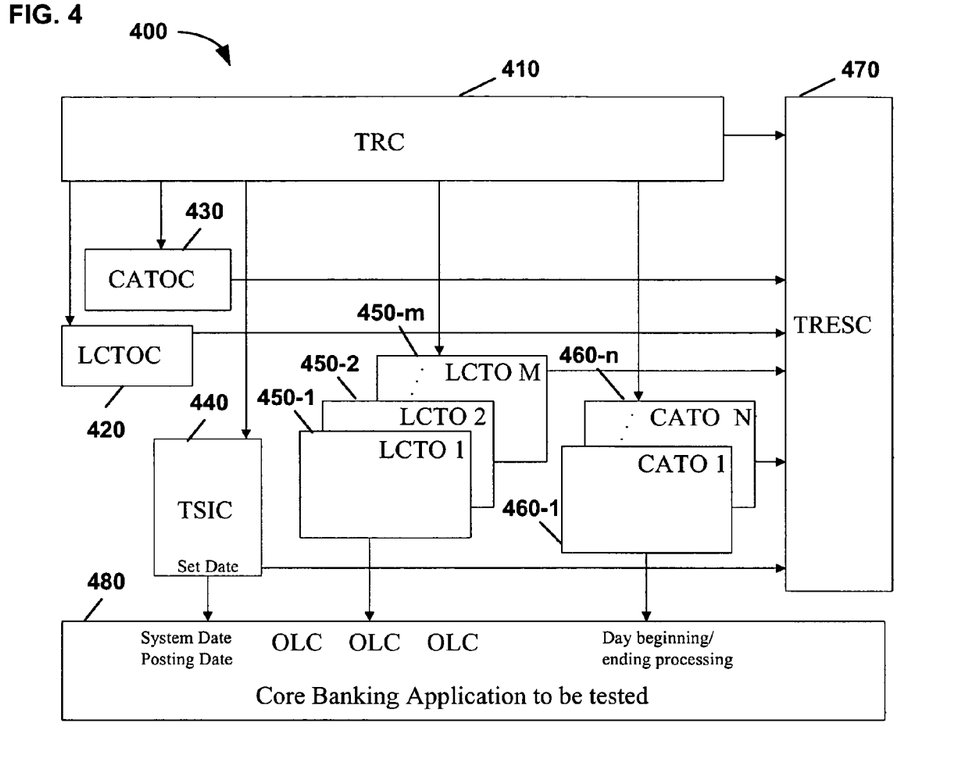
FIG. 4 is a block diagram of a test framework architecture for the automatic testing of complex core banking applications with multiple independent test cases, in accordance with an embodiment of the present invention.

FIG. 4 is a block diagram of a test framework architecture for the automatic testing of complex core banking applications with multiple independent test cases, in accordance with an embodiment of the present invention.

In FIG. 4, a test framework architecture 400 may include a test run controller ("TRC") 410 that may be coupled to a life cycle test object controller ("LCTOC") 420, a central activity test object controller ("CATOC") 430, a test step initialization controller ("TSIC") 440, one or more life cycle test objects ("LCTOs") 450-1 to 450-$m$, one or more central activity test objects ("CATOs") 460-1 to 460-$n$, and a test result controller ("TRESC") 470. Each of LCTOC 420, and CATOC 430 may be coupled to TRESC 470. Likewise, TSIC 440, one or more LCTOs 450-1 to 450-$m$, and one or more CATOs 460-1 to 460-$n$ may be coupled to an application 480 to be tested and to TRESC 470.

In FIG. 4, TRC 410 may be the master test object that is responsible for controlling the complete test run. TRC 410 may communicate with LCTOs 450-1 to 450-$m$ and CATOs 460-1 to 460-$n$. TRC 410 may inform LCTOs 450-1 to 450-$m$ when it needs to perform a test step in their "object life cycle" and TRC 410 may inform CATOs 460-1 to 460-$n$ when a central activity must be performed. TRC 410 may also start the switching to the next "test step of the complete test run" by calling TSIC 440. TRC 410 may send messages, for example, error messages generated by the framework, to TRESC 470 for storage.

In FIG. 4, each LCTO 450-1 to 450-$m$ may be responsible for testing one scenario, for example, the whole life cycle of an application object ("OLC—object life cycle") in application 280 that has to be tested. The test may consist of a sequence of test actions where each test action may belong to exactly one test element of the complete test run. Between each test element, central actions (for all OLCs together at the same time) may be necessary. Generally, LCTO 450-1 may be independent of the other LCTOs 450-2 to 440-$m$ and, thus, LCTO 450-1 may only have influence on the OLC for which it is responsible. Likewise, LCTO 450-1 and the related OLC have no influence on the behavior of the other OLCs in application 480. As a result, the test architecture is scalable so that a new LCTO may be added that may have no impact on the existing LCTOs and OLCs. Each LCTO 450-1 to 450-$m$ may be called by TRC 410 for a special "general test element" and each LCTO 450-1 to 450-$m$ may perform all of the activities belonging to the "general test element." LCTO 450-1 to 450-$m$ may send messages, for example, error messages generated as a result of test activity, to TRESC 470 for storage.

In FIG. 4, in general, only one instance of LCTOC 420 may exist in test framework architecture 400 and LCTOC 420 may have persistent knowledge about each LCTO 450-1 to 450-$m$ in test framework architecture 400. LCTOC 420 may send messages, for example, error messages that occur within the framework to TRESC 470 for storage.

In FIG. 4, CATOs 460-1 to 460-$n$ may each be test objects that are responsible for central test activities. In general, there are two kinds of central test activities, for example, activities that may be performed at the beginning of a "test element of the complete test run" and activities that may be performed at the end of a "test element of the complete test run". These activities may have influence on several OLCs in application 480. Each CATO may be called by TRC 410 for a special "general test element" with the control-information "beginning or end of this general test element" and the information which central test activities must be performed. CATOs 460-1 to 460-$n$ may send messages, for example, error messages generated as a result of test activity, to TRESC 470 for storage.

In general, there may be only one instance of a CATO in accordance with an embodiment of the present invention in FIG. 4. This CATO may be responsible for the "day beginning processing of a bank working day" and for the "day end processing of a bank working day". The CATO may perform these actions only in the case that the actual global test step belongs to a system date that is also a valid bank working day.

In FIG. 4, in general, only one instance of CATOC 430 may exist in test framework architecture 400 and CATOC 430 may have persistent knowledge about each CATO 460-1 to 460-n and the activities that are available from each CATO 460-1 to 460-n. CATOC 430 may send messages, for example, error messages generated at the framework level, to TRESC 470 for storage.

FIG. 4, TSIC 440 may be responsible for the global initialization of the next "test element of the complete test run" and, in general, there may be only one instance of TSIC 440. Likewise, in FIG. 4, in general, only one instance of TRESC 470 may exist and may be responsible for persistent storage of the test results (e.g., errors and ok messages). Messages may be assigned to the test objects (i.e., LCTOs 450-1 to 450-m and CATOs 460-1 to 460-n). TSIC 440 may send messages, for example, error messages generated as a result of test activity, to TRESC 470 for storage.

In test framework architecture 400 of FIG. 4, a test run may be performed by starting TRC 210 and having it obtain a list of active LCTOs 450-1 to 450-m from LCTOC 420 and a list of active CATOs 460-1 to 460-n from CATOC 430. TRC 410 may initialize a current test element counter variable to equal one (1), for example, actual_global_test_element=1. TRC 410 may call TSIC 440 to initialize a loop for the current test element specified by the current test element, for example, first test element 311, specified by the current test element counter variable and call CATOs 460-1 to 460-n to perform central activities, for example, starting central activity 330, for the "start part" of the current test element. TRC 410 may call LCTOs 450-1 to 450-m to perform test activities, for example, first test case first activity 315, first test case second activity 317 and a second test case first activity 322, belonging to the current test element and call CATOs 460-1 to 460-n to perform central activities, for example, ending central activity 340, for the "end part" of the current test element. TRC 410 may determine whether there are more test elements to be executed, increment the current test element counter variable by 1 and loop back to call TSIC 440 to initialize a new loop for the incremented test element and continue executing the test cases for the next test element, for example, second test element 312, as described above, if this was not the last test element. However, if there are no more test elements, TRC 410 may stop executing the test cases.

In general, in FIG. 4, test executions in test framework architecture 400 may produce reproducible results, since the test cases generally start from a standard initialized system environment state and LCTOs 450-1 to 450-m for each test case consistently specify what is needed to perform the tests from the standard initialized system environment state. To ensure that LCTOs 450-1 to 450-m can consistently specify what is needed, it is important to correctly determine which LCTO is to perform the test activities in a general test element. In one embodiment of the present invention, this determination may be accomplished at the beginning of execution of each test element by having TRC 410 request that each LCTO 450-1 to 450-m return a list of all relevant "global test elements" associated with that LCTO.

In another embodiment of the present invention, in FIG. 4, TRC 410 may also correctly determine which LCTO is to perform test activities in a general test element by requesting each LCTO 450-1 to 450-m to return a number of first global test element 111. It should be noted that the number may be greater than or equal to a given "global test element," since TRC 410 may not always start with element 1. Alternatively, TRC 410 may request LCTOC 420 to return the first "global test element" for each LCTO 450-1 to 450-m and this information may be persistently stored in LCTOC 420. After performing the test activities of the last test element of an LCTO, for example LCTO 450-1, LCTO 450-1 may return a special return code to TRC 410 to indicate that there are no more test elements to be performed by LCTO 450-1.

In general, TRC 410 may determine that the execution of a test run is complete when one of the following conditions occurs: a last "global test element" has been executed; a user starting TRC 410 explicitly set a "max number of global test elements" and the maximum number of global test elements have been performed; or an error has occurred in one of CATOs 460-1 to 460-n.

During the execution of a test case, in test framework architecture 400 of FIG. 4, it is important to determine which LCTO 450-1 to 450-m needs what global test activities at the beginning and/or end of which global test element. In accordance with one embodiment of the present invention, this determination may be accomplished by having TRC 410 request each LCTO 450-1 to 450-m return a list to identify:

a global test element;

an activity to be performed at the beginning or end of this global test element;

a CATO-ID; and an activity-ID.

In accordance with another embodiment of the present invention, the determination of the global test activities that are needed may be accomplished by having each LCTO 450-1 to 450-m implement a service to determine the next central activities that may be needed. For example, the service may receive as an input a global test element and may output the next global test element that is greater than or equal to the input global test element for which each LCTO may need global test activities. A list of test activities for each global test element 311, 312 may identify:

whether an activity should be performed at the beginning or end of the global test element;

a CATO-ID; and an activity-ID.

Although, TRC 410 may call every LCTO 450-1 to 450-m at the beginning of every global test element, TRC 410 may call at the end of every global test element only those LCTOs for which global test activities have been performed in the global test element.

A "test element" may represent one system date. For every system date a "bank working day" may be determined. CATO 460 may perform only test activities, if the actual system date is also a valid bank working day.

In accordance with an embodiment of the present invention, a test case may be defined by the definition of a LCTO, which may describe the complete test scenario and may be internally structured by test elements. As a result, each test activity of the LCTO may be assigned to exactly one test element.

In the test execution phase, TRC 410 may be responsible for executing the test. The main object used in executing the tests is the "test element". This means that TRC 410 may loop at all relevant test elements and in this loop it may call all LCTOs 450-1 to 450-m to perform the test activities belonging only to this test element.

Integration of central activities. In FIG. 4, test framework architecture 400 may also perform central activities that may have influence on several OLCs. Every LCTO 450-1 to 450-*m* may request such central activities be performed at the beginning or at the end of a test element. LCTOs 450-1 to 450-1 may inform TRC 410 about the central activities they need. The central activities may be performed by CATOs 460-1 to 460-*n* and TRC 410 may inform CATOs 460-1 to 460-*n* when to perform a central activity.

Test framework architecture 400, in FIG. 4, may support the execution of several different test alternatives including:

Alternative 1: Run the complete test

Alternative 2: Run the tests from the beginning until a special "global test element"

Alternative 3: Continue a test run which was interrupted in a previous run (by choosing alternative 2)

Where, alternative 2 may be useful in the following cases:

Performing a software upgrade between alternative 2 and alternative 3

Making some detailed manual checks after the tests performed by alternative 2

Behavior after an error. In FIG. 4, if an error occurs in one of LCTOs 450-1 to 450-*m*, for example, LCTO 450-1, LCTO 450-1 may stop and all other parts of the central test may continue executing. However, if an error occurs in one of CATOs 460-1 to 460-*n* or in TRC 410 or TSIC 440, the complete test run may stop.

In FIG. 4, in accordance with an embodiment of the present invention, the functionality of a "standing order" may be tested. Specifically, the life cycle of an application object ("OLC") "standing order" may be tested by creating a LCTO "standing order" that may contain the following elements:

Test element 1 of this LCTO (this test element, for example, may be assigned to the date 25, Aug. 2004) may include:

Create a business partner

Create an account

Create a standing order, monthly, executed on the first of the month

Make postings on the account

Test element 2 of this LCTO (this test element, for example, may be assigned to the date 25, Sep. 2004) may include:

Verify the execution of the standing order (stored in database?)

Is the amount on the account correct

In addition, CATO 460 may be needed for the execution of the "standing order" and CATO 460 may run in a test step, which may be assigned to the first of September 2004 (01, Sep. 2004).

Figure 5:
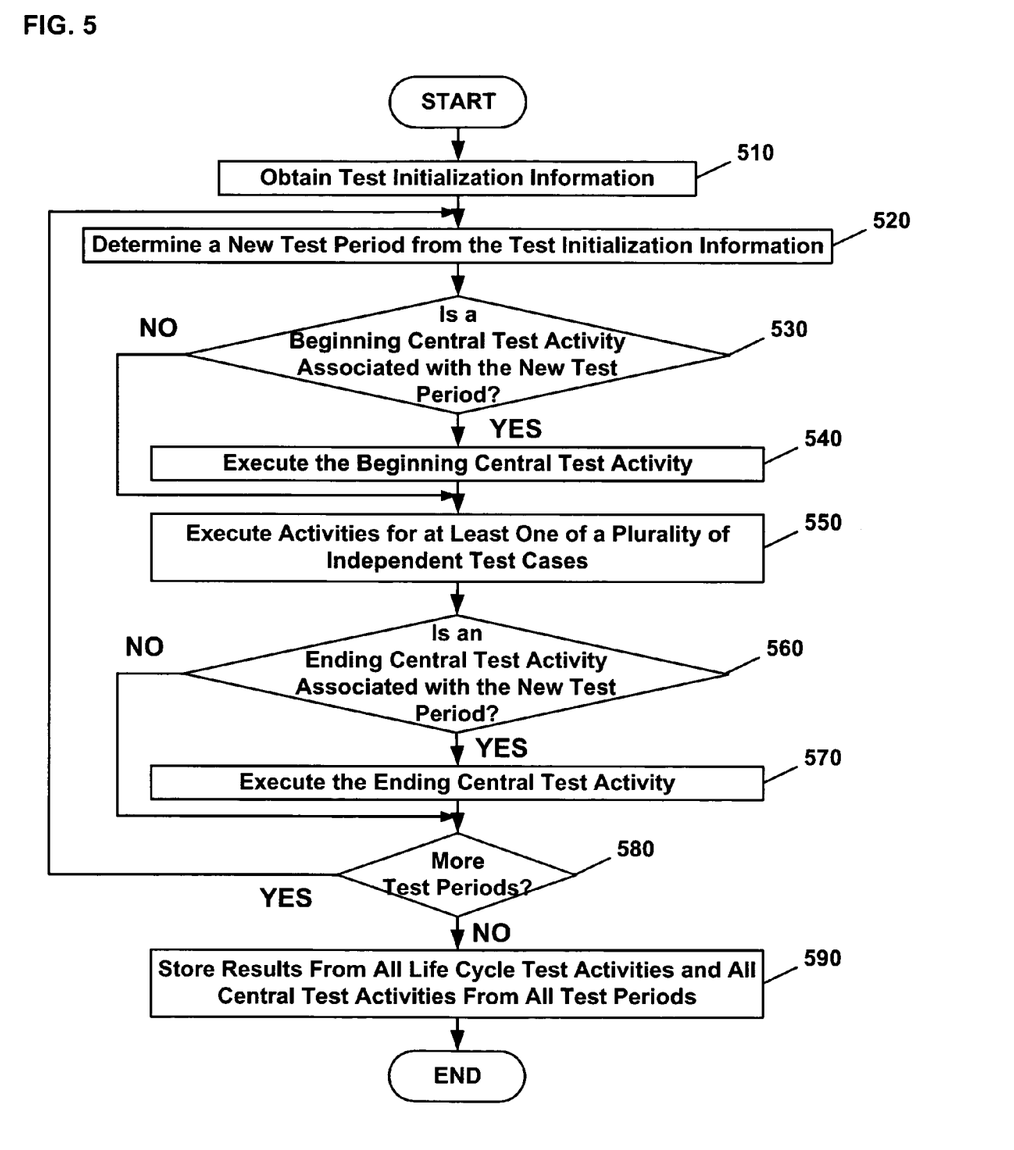
FIG. 5 is a flow diagram of a method for the automatic testing of complex applications with multiple independent test cases, in accordance with an embodiment of the present invention.

FIG. 5 is a flow diagram of a method for the automatic testing of complex applications with multiple independent test cases, in accordance with an embodiment of the present invention. In FIG. 5, a TRC may obtain (510) test initialization information and determine (520) a new test period from the test initialization information. The TRC may determine (530) whether a beginning central test activity is associated with the new test period. TRC may call at least one CATO to execute (540) the beginning central test activity, if a beginning central test activity is determined (530) to be associated with the new test period. Regardless of what is determined (530), the TRC may call one or more LCTO to execute (550) activities for at least one of a plurality of independent test cases. Alternatively, the TRC also may not call any LCTOs to execute (550) activities.

In FIG. 5, the TRC may determine (560) whether an ending central test activity is associated with the new test period. The TRC may call at least one CATO to execute (570) the ending central test activity, if an ending central test activity is determined (560) to be associated with the new test period. Regardless of what is determined (560), the TRC may determine (580) whether more test periods remain in the test cases. The method may loop back and the TRC may determine (520) another new test period from the test initialization information and the method may continue as described above. If no additional test periods are determined (580) to remain in the test cases, the TRC may store (590) results from all life cycle test activities and all central test activities from all test periods in a TRESC and the method may terminate. Alternatively, the TRC also may not call any LCTOs to execute (650) activities.

Figure 6:
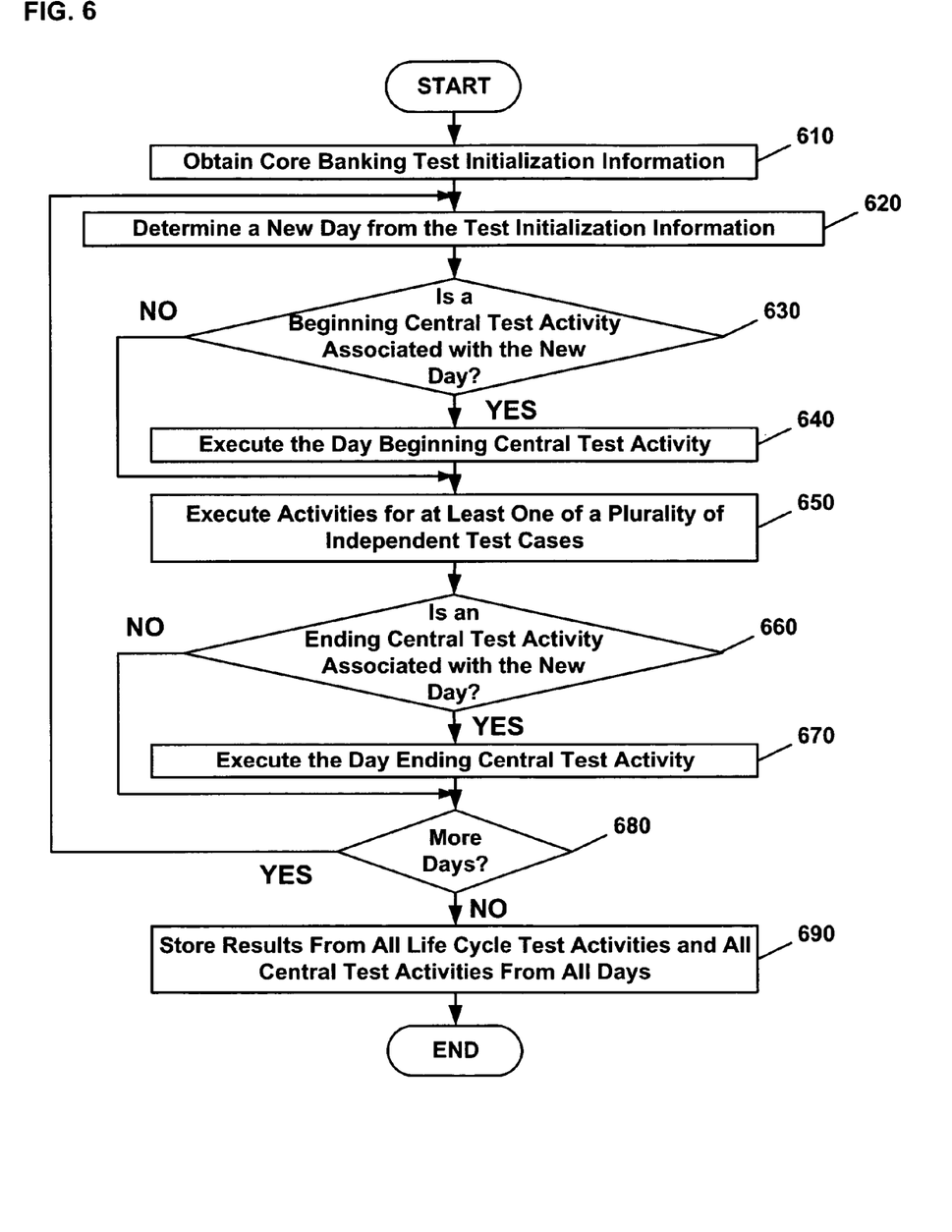
FIG. 6 is a flow diagram of a method for the automatic testing of complex core banking applications with multiple independent test cases, in accordance with an embodiment of the present invention.

FIG. 6 is a flow diagram of a method for the automatic testing of complex core banking applications with multiple independent test cases, in accordance with an embodiment of the present invention. In FIG. 6, a TRC may obtain (610) test initialization information and determine (620) a new test period from the test initialization information. The TRC may determine (630) whether a beginning central test activity is associated with the new test period. TRC may call at least one CATO to execute (640) the beginning central test activity, if a beginning central test activity is determined (630) to be associated with the new test period. Regardless of what is determined (630), the TRC may call at least one LCTO to execute (650) activities for at least one of a plurality of independent test cases.

In FIG. 6, the TRC may determine (660) whether an ending central test activity is associated with the new test period. The TRC may call at least one CATO to execute (670) the ending central test activity, if an ending central test activity is determined (660) to be associated with the new test period. Regardless of what is determined (660), the TRC may determine (680) whether more test periods remain in the test cases. The method may loop back and the TRC may determine (620) another new test period from the test initialization information and the method may continue as described above. If no additional test periods are determined (680) to remain in the test cases, the TRC may store (690) results from all life cycle test activities and all central test activities from all test periods in a TRESC and the method may terminate.

Several embodiments of the present invention are specifically illustrated and described herein. However, it will be appreciated that modifications and variations of the present invention are covered by the above teachings and come within the purview of the appended claims without departing from the spirit and intended scope of the invention.

What is claimed is:

1. A computer-implemented method for testing software applications using a plurality of test cases representing different practical scenarios, comprising:

reading, by the computer, object data defining a plurality of test cases, each test case identifying unique object(s) corresponding to the test case, each test case further identifying central test activities to be performed by a test program upon all objects of the test cases and individual test activities to be performed by the test program upon the objects corresponding to the respective test case, execution of each individual test activity within a specific test case being independent of execution of individual test activities of any other test cases so that an addition of a new test case does not affect any existing test cases;

scheduling, by the computer, execution of the central test activities and the individual test activities by:

scheduling execution of central test activities of a first set of test cases;

scheduling execution of the individual test activities of the first set of test cases according to their positions with respect to the central test activities within the respective the first set of test cases, wherein execution of an individual test activity of a first test case within the first set of test cases occurs concurrently with execution of another individual test activity of a second test case within the first set of test cases;

scheduling execution of central test activities of a second set of test cases;

scheduling execution of the individual test activities of the second set of test cases according to their positions with respect to the central test activities within the respective the second set of test cases, wherein execution of an individual test activity of a first test case within the second set of test cases occurs concurrently with execution of another individual test activity of a second test case within the second set of test cases; and executing the central test activities and the individual test activities of the first set of test cases as scheduled; and executing the central test activities and the individual test activities of the second set of test cases as scheduled, wherein each central test activity is only executed once at a synchronization point for all of concurrently executing test cases.

2. The method of claim 1 wherein the reading the object data comprises:
obtaining a listing of all of the plurality of independent test cases; and
obtaining a listing of all beginning and ending central test activities.

3. The method of claim 2 wherein the obtaining the listing of all of the plurality of independent test cases comprises:
obtaining a listing of all life cycle test objects for each of the plurality of independent test cases.

4. The method of claim 3 wherein the obtaining the listing of all life cycle test objects for each of the plurality of independent test cases comprises:
obtaining a listing of actions associated with each of the life cycle test objects for each test period for each of the plurality of independent test cases.

5. The method of claim 4 wherein at least one of the test periods has actions associated with at least one life cycle test object.

6. The method of claim 5 wherein the reading the object data comprises:
determining a first test period with the beginning central test activity.

7. The method of claim 5 wherein the reading the object data comprises:
determining a first test period with an activity associated with the at least one of the plurality of independent test cases.

8. The method of claim 2 wherein the obtaining the listing of all beginning and ending central test activities comprises:
obtaining a listing of all beginning central test activities associated with each test period; and
obtaining a listing of all ending central test activities associated with each test period.

9. The method of claim 8 wherein at least one test period is associated with beginning central test activities.

10. The method of claim 8 wherein at least one test period is associated with ending test activities.

11. The method of claim 1 wherein the executing the beginning comprises:
determining execution of all other test activities has stopped; and
executing the beginning central test activity.

12. The method of claim 1 wherein the executing individual test activities for at least one of a plurality of independent test cases associated with the first test period comprises:
determining execution of the beginning one of the plurality of central test activities has stopped; and
executing the individual test activities for the at least one plurality of independent test cases associated with the first test period.

13. The method of claim 1 wherein the executing an ending one of the plurality of central test activities comprises:
determining execution of all test activities associated with the plurality of independent test cases has stopped; and
executing the ending central test activity.

14. The method of claim 1 further comprising:
storing results of all of the execution from all test periods, wherein the results are stored in a single data object.

15. The method of claim 14 wherein the storing the results in a single data object comprises:
storing error messages in the single data object; and
storing results from correctly executing test activities.

16. The method of claim 1 wherein a first test period represents a first specific time period within each of the test cases.

17. The method of claim 1 wherein the independent test cases run in parallel.

18. The method of claim 1 wherein the central test activity exerts an influence on all of the test cases.

19. The method of claim 1 wherein a number count of the individual test activities associated with the first test case within a same set of test cases is different from a number count of the individual test activities associated with the second test case within the same set of test cases.

20. The method of claim 1 wherein the individual test activities associated with the first test case within a same set of test cases are same as the individual test activities associated with the second test case within the same set of test cases.

21. The method of claim 1 wherein the individual test activities associated with the first test case within a same set of test cases are different from the individual test activities associated with the second test case within the same set of test cases.

22. The method of claim 1 wherein a first time duration starts according to business days.

23. The method of claim 1 wherein a first time duration starts monthly.

24. The method of claim 1 wherein the beginning one of the central test activities is executed according to a predetermined schedule.

25. The computer-implemented method of claim 1, wherein the testing is executed through a plurality of synchronization points, and wherein each of the central test activities is executed at a synchronization point.

26. A non-transitory machine-readable medium having stored thereon a plurality of executable instructions to perform a method for testing software applications using a plurality of test cases representing different practice scenarios, comprising:
reading object data defining a plurality of test cases, each test case identifying unique object(s) corresponding to the test case, each test case further identifying central test activities to be performed by a test program upon all objects of the test cases and individual test activities to be performed by the test program upon the objects corresponding to the respective test case, execution of each individual test activity within a specific test case being independent of execution of individual test activities of any other test cases so that an addition of a new test case does not affect any existing test cases;

scheduling, by the computer, execution of the central test activities and the individual test activities by:
  scheduling execution of central test activities of a first set of test cases;
  scheduling execution of the individual test activities for the first set of test cases according to their positions with respect to the central test activities within the respective the first set of test cases, wherein execution of an individual test activity of a first test case within the first set of test cases occurs concurrently with execution of another individual test activity of a second test case within the first set of test cases;
  scheduling execution of central test activities of a second set of test cases;
  scheduling execution of the individual test activities of the second set of test cases according to their positions with respect to the central test activities within the respective the second set of test cases, wherein execution of an individual test activity of a first test case within the second set of test cases occurs concurrently with execution of another individual test activity of a second test case within the second set of test cases; and
executing the central test activities and the individual test activities of the first set of test cases as scheduled; and
executing the central test activities and the individual test activities of the second set of test cases as scheduled,
wherein each central test activity is only executed once at a synchronization point for all of the concurrently executing test cases.

27. The non-transitory machine-readable medium of claim 26 wherein the reading the object data comprises:
  obtaining a listing of all of the plurality of independent test cases; and
  obtaining a listing of all beginning and ending central test activities.

28. The non-transitory machine-readable medium of claim 27 wherein the obtaining the listing of all of the plurality of independent test cases comprises:
  obtaining a listing of all life cycle test objects for each of the plurality of independent test cases.

29. The non-transitory machine-readable medium of claim 28 wherein the obtaining the listing of all life cycle test objects for each of the plurality of independent test cases comprises:
  obtaining a listing of actions associated with each of the life cycle test objects for each test period for each of the plurality of independent test cases.

30. The non-transitory machine-readable medium of claim 29 wherein at least one of the test periods has actions associated with at least one life cycle test object.

31. The non-transitory machine-readable medium of claim 30 wherein at least one test period is associated with the beginning test activities.

32. The non-transitory machine-readable medium of claim 30 wherein at least one test period is associated with the ending test activities.

33. The non-transitory machine-readable medium of claim 27 wherein the obtaining the listing of all beginning and ending central test activities comprises:
  obtaining a listing of all beginning central test activities associated with each test period; and
  obtaining a listing of all ending central test activities associated with each test period.

34. The non-transitory machine-readable medium of claim 33 wherein the reading the object data comprises:
  determining a first test period with the beginning central test activity.

35. The non-transitory machine-readable medium of claim 33 wherein the reading the object data comprises:
  determining a first test period with an activity associated with the at least one of the plurality of independent test cases.

36. The non-transitory machine-readable medium of claim 26 wherein the executing the beginning central test activity comprises:
  determining execution of all other test activities has stopped; and
  executing the beginning central test activity.

37. The non-transitory machine-readable medium of claim 26 wherein the executing individual test activities for at least one of a plurality of independent test cases associated with the first test period comprises:
  determining execution of the beginning one of the plurality of central test activities has stopped; and
  executing the individual test activities for the at least one plurality of independent test cases associated with the first test period.

38. The non-transitory machine-readable medium of claim 26 wherein the executing the ending central test activity comprises:
  determining execution of all test activities associated with the plurality of independent test cases has stopped; and
  executing the ending central test activity.

39. The non-transitory machine-readable medium of claim 26 further comprising:
  storing results of all of the execution from all test periods, wherein the results are stored in a single data object.

40. The non-transitory machine-readable medium of claim 39 wherein the storing the results in a single data object comprises:
  storing error messages in the single data object; and
  storing results from correctly executing test activities.

41. A non-transitory machine-readable medium having stored thereon a plurality of executable instructions encoding a test framework, the test framework comprising:
  a test run controller;
  at least one life cycle test object registered to the test run controller, wherein each of the at least one life cycle test object is independent of any other, each life cycle test object including at least one life cycle test object activity to be executed during a predetermined test period;
  a life cycle test object controller registered to the test run controller and the at least one life cycle test object, the life cycle test object controller to maintain a list of the at least one life cycle test object;
  at least one central activity test object registered to the test run controller, each central activity test object to be executed during a test period without any life cycle test object activities being executed;
  a central activity test object controller registered to the test run controller and the at least one central activity test object, the central activity test object controller to maintain a list of the at least one central activity test object;
  a test period initialization controller registered to the test run controller, the test period initialization controller to read object data defining a plurality of test cases, each test case identifying unique object(s) corresponding to the test case, each test case further identifying the at least one life cycle object corresponding individual test activities and the at least one central activity test object corresponding central test activities to be performed by the test run controller upon all objects of the test cases, and to schedule execution of the central test activities and the individual test activities, wherein execution of an individual test activity of a first test case occurs concurrently with execution of another individual test activity of a second test case;

an application to be tested, the application connected to the test period initialization controller, the at least one life cycle test object and the at least one central activity test object; and a test result controller to receive results from the test run controller, the life cycle test object controller, the central activity test object controller, the test period initialization controller, the at least one life cycle test object, and the at least one central activity test object, wherein execution of each individual test activity within a specific test case is independent of execution of individual test activities of any other test cases so that an addition of a new test case does not affect any existing test cases, and wherein the each central test activity is only executed once at a synchronization point for all concurrently executing test cases.

42. The non-transitory machine-readable medium of claim 41 wherein each life cycle test object controls the life cycle of an associated single application object.

43. The non-transitory machine-readable medium of claim 42 wherein execution of each life cycle test object only effects the single application object associated with the life cycle test object.

44. The non-transitory machine-readable medium of claim 41 wherein the test run controller comprises:

a master test object to control execution of a test run including a plurality of test periods.

45. The non-transitory machine-readable medium of claim 44 wherein the master test object is to instruct life cycle test objects associated with a test period to execute during the test period and to instruct central activity test objects associated with the test period to execute during the test period.

46. The non-transitory machine-readable medium of claim 45 wherein the master test object is to determine which life cycle test objects are associated with a given test period by requesting the list of the at least one life cycle test object from the life cycle test object controller.

47. The non-transitory machine-readable medium of claim 45 wherein the master test object is to determine which central activity test objects are associated with a given test period by requesting the list of the at least one central activity test object from the central activity test object controller.

48. The non-transitory machine-readable medium of claim 44 wherein the master test object is to:

obtain the list of active life cycle test objects in the test run from the life cycle test object controller;

obtain the list of active central activity test objects in the test run from the central activity test object controller; and while a test period remains in the test run select a time duration of a next test period, request the test step initialization controller initialize the next test period, request all central activity test objects associated with the next test period to execute their beginning central test activities, request all life cycle test objects associated with the next test period to execute their test activities, and request all central activity test objects associated with the next test period to execute their ending central test activities.

49. The non-transitory machine-readable medium of claim 48 wherein the test run is to terminate upon an error occurring during execution of one of the central activity test objects.

50. The non-transitory machine-readable medium of claim 48 wherein the test run is to pause execution after a predetermined test period, receive an upgrade of the application, and resume execution of the test run using the upgraded application.

51. The non-transitory machine-readable medium of claim 48 wherein the test run controller is to determine which central activity test objects are associated with each test period from the life cycle test objects associated with the test period.

52. The non-transitory machine-readable medium of claim 48 wherein each life cycle test object is to determine which central activity test objects are associated with the test period associated with the life cycle test object.

53. A non-transitory computer-readable medium having stored thereon a plurality of executable instructions to perform a method of managing operations of a test program to test functionality of an application program, comprising:

reading, by the computer, object data defining a plurality of test cases, wherein the object data is a data structure comprising fields for:

a plurality of test cases, each test case identifying object(s) managed by the computer application to which the respective test case relates, each test case storing:

first fields for storage of identifiers representing central test activities common to all the test cases, the central test activity identifiers identifying respective test operations to be performed by the test program upon all objects of the test cases, the first fields identifying a time when the respective central test operation is to be performed during execution of the test cases;

second fields for storage of identifiers representing individual test activities unique to the respective test case, the individual test activity identifiers identifying respective test operations to be performed by the test program upon the objects of the respective test case, the second fields identifying a time when the respective individual test activity is to be performed during execution of the respective test cases, scheduling, by the computer, execution of the central test activities and the individual test activities by:

scheduling execution of the central test activities upon the objects of all the test cases to occur simultaneously, scheduling execution of the individual test activities of the respective test cases according to their position with respect to the central test activities within the respective test cases, wherein execution of an individual test activity of a first test case occurs concurrently with execution of another individual test activity of a second test case, wherein execution of each individual test activity within a specific test case is independent of execution of individual test activities of any other test cases so that an addition of a new test case does not affect any existing test cases, and executing the central test activities and the individual test activities as scheduled, wherein each central test activity is only executed once at a synchronization point for all of the concurrently executing test cases.

54. A computer-implemented method of managing operations of a test program to test functionality of an application program, comprising:

reading, by the computer, object data defining a plurality of test cases, each test case identifying unique object(s) corresponding to the test case, each test case further identifying central test activities to be performed by the test program upon all objects of the test cases and individual test activities to be performed by the test program upon the objects corresponding to the respective test case, execution of each individual test activity within a specific test case being independent of execution of individual test activities of any other test cases so that an addition of a new test case does not affect any existing test cases;

scheduling, by the computer, execution of the central test activities and the individual test activities by:
scheduling execution of the central test activities upon the objects of all the test cases to occur simultaneously,
scheduling execution of the individual test activities of the respective test cases according to their position with respect to the central test activities within the respective test cases, wherein execution of an individual test activity of a first test case occurs concurrently with execution of another individual test activity of a second test case; and executing the central test activities and the individual test activities as scheduled, wherein each central test activity is only executed once at a synchronization point for all of the concurrently executing test cases.

55. The computer-implemented method of claim 54, wherein the test program is executed through a plurality of synchronization points, and wherein each of the central test activities is executed at a synchronization point.

56. The computer-implemented method of claim 55, further comprising:

registering, by the computer, each of the objects with the test program to inform the test program about the central test activities at the sync points and the individual test activities of the test case identified by the object.

57. The computer-implemented method of claim 54, further comprising:

updating the object data with a new plurality of test cases.

58. The computer-implemented method of claim 57, wherein the update includes adding at least one new test case to the existing plurality of test cases.

59. The computer-implemented method of claim 54, wherein the object data is stored as a data structure, the data structure including:

the plurality of test cases, each test case identifying the object(s) to which the respective test case relates, the each test case storing:

first fields for storage of identifiers representing the central test activities, the first fields identifying synchronization points at which the central test activities are to be performed;

second fields for storage of identifiers representing the individual test activities unique to the respective test case, the first fields identifying a time during execution of the respective test case when the respective test activity is to be performed.

\* \* \* \* \*